April 6, 1965 E. F. COX 3,176,472

MICROTOME FREEZING SYSTEM

Filed May 8, 1963

Inventor
Everett F. Cox
By Hofgren, Wegner, Allen, Stellman & McCord
Attorneys

United States Patent Office 3,176,472

Patented Apr. 6, 1965

3,176,472

MICROTOME FREEZING SYSTEM

Everett F. Cox, Benton Harbor, Mich., assignor to Whirlpool Corporation, a corporation of Delaware Filed May 8, 1963, Ser. No. 278,828
9 Claims. (Cl. 62—3)

This invention relates to a thermoelectric freezing apparatus for freezing a microtome specimen.

The apparatus of this invention utilizes thermoelectric cooling means for quick freezing a fresh tissue specimen preparatory to transfer to the table of a microtome in order that thin sections may be cut from the frozen specimen. Because the apparatus of this invention utilizes thermoelectric cooling means, it is readily portable so that the specimen may be rapidly frozen in the operating room and then the apparatus with the frozen specimen therein transported relatively long distances without thawing, as the apparatus in its preferred embodiment also provides insulating means for the frozen specimen.

One of the features of this invention is to provide an improved apparatus for freezing a microtome specimen utilizing thermoelectric cooling means for rapid freezing of the specimen.

Another feature of the invention is to provide such an apparatus wherein heat sink means including a liquid heat sink means is utilized for transferring heat from the specimen to the thermoelectric cooling means.

Other features and advantages of the invention will be apparent from the following description of one embodiment thereof as shown in the accompanying drawings. Of the drawings.

Figure 1:
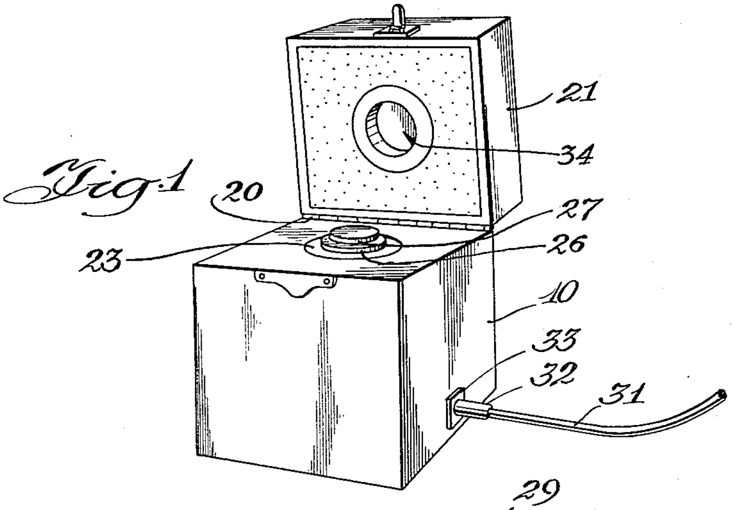
FIGURE 1 is a perspective view of an embodiment of the invention.

In the embodiment shown in the drawings there is provided an enclosure member 10 having a top wall 11. Located within the enclosure member 10 is a thermally conducting metal container 12 having thermal conducting walls and adapted to contain a liquid 13 that will not freeze at the operating temperatures of the apparatus. Such a liquid may be an ordinary ice and salt (sodium chloride) brine.

In heat transfer relationship on the outer sides of the side walls 14 of the container 12 are thermoelectric modules or panels 15 which are of ordinary construction containing thermoelectric elements (not shown) connected in series with their cold junctions in heat transfer relationship with the walls 14 and the hot junctions remote from these walls. Such panels are disclosed, for example, in Roeder Patent 2,997,514.

In order to cool the hot junctions of the thermoelectric elements and thus improve the cooling ability of the cold junctions, means are provided for cooling the hot junctions such as water jackets 16 in heat transfer relationship with the hot junctions through which water flows in series by way of an inlet conduit 17 and outlet conduit 18. The series flow of this water is illustrated by the connecting conduit 19 that connects the two illustrated water jackets 16.

Hingedly mounted on the enclosure member 10 about a hinge 20 is a hollow lid 21 containing insulation 22, such as any of the ordinary forms of foamed-in-place insulation, for example, polystyrene foam.

Figure 2:
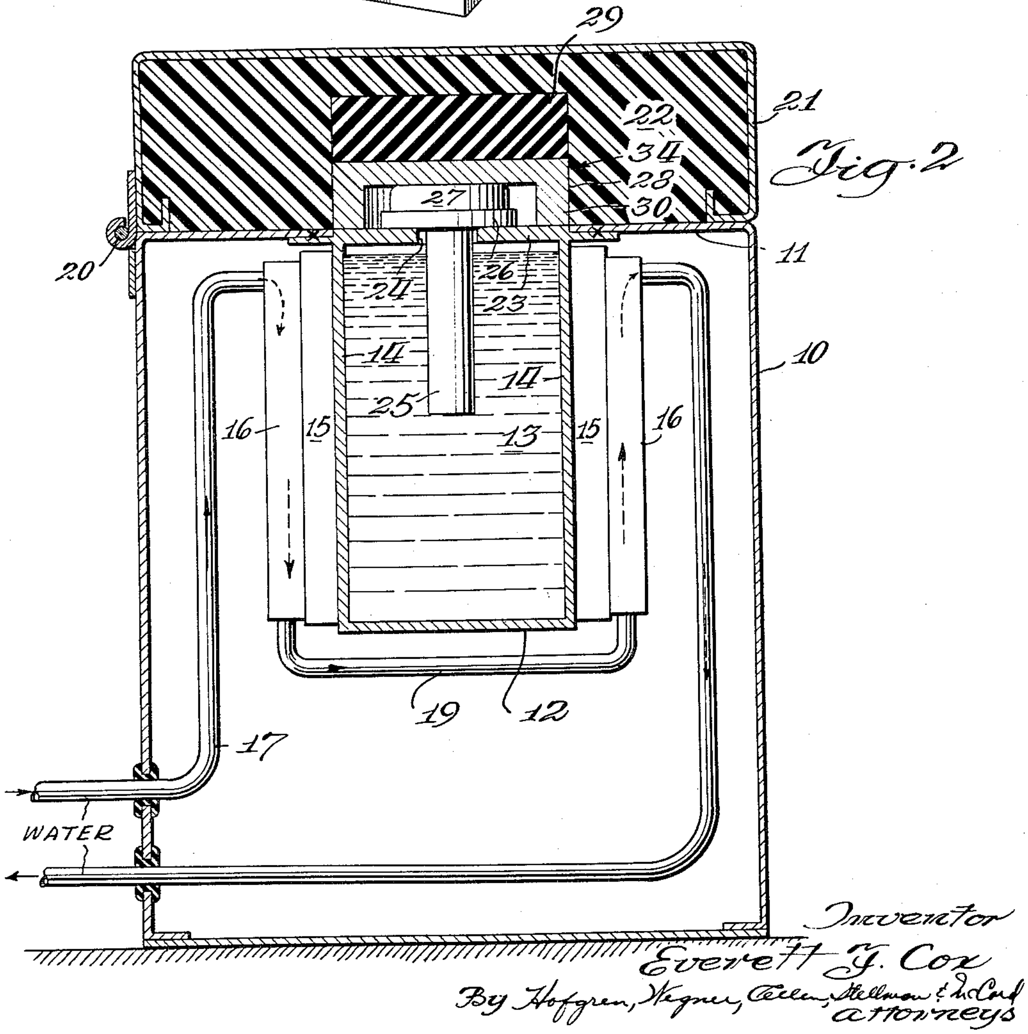
FIGURE 2 is a vertical sectional view taken substantially through the center of the embodiment of FIGURE 1 when the heat insulating lid member is closed on a specimen that is in the process of being frozen.

The lid 21 is shown in FIGURE 1 in open position and in FIGURE 2 in closed position. The lid extends across the top wall 11 of the member 10 and across a top wall 23 of the brine container 12 which substantially coincides with the top wall 11. The brine container wall 23 contains a central opening 24 through which extends a heat conducting member in the foam of a metal rod 25 that is fastened to the bottom of a heat or thermally conducting support 26 in the foam of a metal disk. The rod 25 and disk 26 are integral with each other and the rod 25 extends down through the opening 24 into the brine 13. With this arrangement heat is readily transferred from the support 26 to the rod 25 and from there to the brine solution 13 which thereby acts as a heat sink. The brine is cooled by the thermoelectric panels 15, as previously described.

The support or disk 26 is adapted to retain thereon the microtome specimen 27 during the freezing.

In order to insure rapid freezing, there is also provided a thermally conducting cover member 34 in the form of an inverted shallow cup, preferably also made of metal. This cover member 34 is attached within a hollowed out opening 28 in the insulation 22 and is backed up by a disk 29 of a resilient material such as sponge rubber that is located at the extreme end of the opening 28. The cover member being in the form of an inverted cup surrounds the support 26 and the specimen 27. Annular edge 30 always bears against the top wall 23 of the brine container 12 when the lid 21 is closed and the support 26 does not have a specimen thereon. Thus, the cover member will be chilled by contact with top wall 23 preparatory to encircling a subsequent specimen in a subsequent freezing operation. During the freezing operation the edge may or may not contact wall 23 depending on the thickness of the specimen.

With the above arrangement both the liquid 13 and the cover member 34, which acts as a heat sink, operate to extract heat from the specimen 27 on all sides for rapid freezing of the specimen. Both the cover member 34 and the liquid 13 thereby operate as heat sinks.

As can be seen from the above description, the cover member 34 and the container 12 for the liquid 13 including the top wall 23 function as separable heat sink means movable to surround the specimen during the freezing operation and also movable to expose the specimen for removal from the apparatus. The container with the liquid 13 can be considered a first heat sink means and the cover member 34 a second heat sink means with the thermoelectric cooling means 15 functioning to cool both sink means. The cover member 34 is of course cooled by the thermoelectric means 15 by way of the walls of the container 12.

The thermoelectric cooling means embodied in the panels 15 must, of course, be powered by direct current. This is supplied by means of a usual current carrying insulated conductor 31 having an ordinary electrical plug 32 that is adapted to be received in a socket 33 on the container 10. With this arrangement, after the specimen 27 has been frozen the conductor 31 may be separated from the container, the cooling water conduits 17 and 18 separated from the cooling water supply means and the entire apparatus with the frozen specimen 27 in place transported to the microtome. Because the specimen 27 is so thoroughly insulated it will remain frozen for a long period of time even when the power supply is disconnected as described.

The microtome specimen freezing apparatus of this invention has a number of advantages over prior apparatus of this general nature. Thus, as has been already explained, this apparatus may be easily transported from the operating room to the microtome without the frozen specimen thawing. Furthermore, no freezing medium such as liquid carbon dioxide comes in contact with the specimen so that there is no buildup of frost on the specimen. Also, the specimen is not immersed in any freezing medium but is maintained intact, while the heat of the specimen is transferred first to the heat sink means and then to the thermoelectric device.

A very important advantage of this invention is that it may be located in the operating room near the operating table as it is quite small. The surgeon can therefor continue with the operation and preserve specimens by rapid freezing as he proceeds with the operation.

In a typical embodiment of the invention the antifreeze liquid 13 was maintained at a temperature varying between —15° and —20° F. The specimen whose relative size is indicated at 27 was frozen in between 15 and 20 seconds.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. Apparatus for freezing a microtome specimen, comprising: heat absorbing means including a body of liquid, thermoelectric cooling means arranged in heat transfer relationship with said liquid for chilling the same; and a thermally conducting support for said specimen in heat conducting relationship with said liquid for chilling said specimen.

2. Apparatus for freezing a microtome specimen, comprising: heat absorbing means including a body of liquid, thermoelectric cooling means arranged in heat transfer relationship with said liquid for chilling the same; a thermally conducting support for said specimen in heat conducting relationship with said liquid for chilling said specimen; and a thermally conducting movable cover member for said specimen also in heat conducting relationship with said specimen when in specimen covering position.

3. Apparatus for freezing a microtome specimen, comprising: heat absorbing means including a body of liquid, thermoelectric cooling means arranged in heat transfer relationship with said liquid for chilling the same; a thermally conducting support for said specimen; and a heat conductor member extending from said support into said liquid.

4. The apparatus of claim 3 wherein said support and conductor member are integral.

5. Apparatus for freezing a microtome specimen, comprising: a container having a heat conducting wall and adapted to contain a liquid; thermoelectric cooling means arranged in heat transfer relationship with said wall to chill said liquid; a thermally conducting support for said specimen; a heat conductor member extending from said support into said liquid through an opening in a container wall; and a thermally conducting movable cover member for said specimen also in heat conducting relationship with said specimen when in specimen covering position.

6. Apparatus for freezing a microtome specimen, comprising: an enclosure member; a container within said enclosure member having heat conducting walls and adapted to contain a liquid; thermoelectric cooling means within said enclosure member in heat transfer relationship with at least some of said heat conducting walls; a thermally conducting support for said specimen; a heat conductor member integral with said support extending from the support through an opening in a container wall into said liquid; a thermally conducting cover member adapted to enclose said support and contact said specimen; and a heat insulating lid member attached to and surrounding said cover member and said wall containing said opening, said heat insulating lid member and thus said cover member being movably mounted on said enclosure member to expose said support and a specimen thereon.

7. A portable apparatus for freezing a microtome specimen, comprising: a portable enclosure member; a container within said enclosure member having heat conducting walls and adapted to contain a liquid; thermoelectric cooling means within said enclosure member in heat transfer relationship with at least some of said heat conducting walls and having a hot junction side; a thermally conducting support for said specimen; a heat conductor member integral with said support extending from the support through an opening in a container wall into said liquid, said support and opening being located at the top of said enclosure member; a thermally conducting cover member adapted to enclose said support and contact said specimen; a heat insulating lid member attached to and surrounding said cover member and said wall containing said opening, said heat insulating lid member and thus said cover member being movably mounted on said enclosure member to expose said support and a specimen thereon; power supply means for said thermoelectric cooling means separable at said enclosure member; and cooling means for said hot junction side.

8. Apparatus for freezing a microtome specimen, comprising: first heat absorbing means; second heat absorbing means; means providing a specimen receiving space between said first and second heat absorbing means with said specimen in thermal conducting relationship with both heat absorbing means, said first and second heat absorbing means being arranged to surround completely said specimen and being separable to expose said specimen; and thermoelectric cooling means for chilling both said heat absorbing means to extract heat from said specimen.

9. Apparatus for freezing a microtome specimen, comprising: first heat absorbing means; second heat absorbing means in thermal conducting relationship with said first heat absorbing means; means providing a specimen receiving space between said absorbing means with said specimen in thermal conducting relationship with both heat absorbing means, said first and second heat absorbing means being separable to expose said space; and thermoelectric cooling means for chilling directly said first heat absorbing means thereby also chilling said second heat absorbing means by way of said first heat absorbing means to extract heat from said specimen by way of both said absorbing means.

References Cited by the Examiner

UNITED STATES PATENTS

| | | | |
|---|---|---|---|
| 2,590,725 | 3/52 | Sanger | 62—458 |
| 2,629,230 | 2/53 | Turner | 62—458 |
| 2,959,925 | 11/60 | Frantti | 62—3 |
| 2,964,912 | 12/60 | Roeder | 62—3 |
| 2,991,628 | 7/61 | Tuck | 62—3 |
| 2,996,889 | 8/61 | Roeder | 62—3 |
| 3,035,416 | 5/62 | Wagner | 62—3 |

FOREIGN PATENTS

| | | |
|---|---|---|
| 210,986 | 6/09 | Germany. |

ROBERT A. O'LEARY, *Primary Examiner.*

WILLIAM J. WYE, *Examiner.*